United States Patent
Bateman

(10) Patent No.: US 6,899,491 B2
(45) Date of Patent: May 31, 2005

(54) HYDRAULIC CONTROL ARRANGEMENT FOR A PIPE RELINING MACHINE

(75) Inventor: Ian Roger Bateman, Happy Valley (AU)

(73) Assignee: Rib Loc Australia Pty LTD, South Australia (AU)

( * ) Notice: Subject to any disclaimer, the term of this patent is extended or adjusted under 35 U.S.C. 154(b) by 0 days.

(21) Appl. No.: 10/479,689

(22) PCT Filed: Jun. 7, 2002

(86) PCT No.: PCT/AU02/00735

§ 371 (c)(1),
(2), (4) Date: Dec. 4, 2003

(87) PCT Pub. No.: WO02/101247

PCT Pub. Date: Dec. 19, 2002

(65) Prior Publication Data

US 2004/0136786 A1 Jul. 15, 2004

(30) Foreign Application Priority Data

Jun. 8, 2001 (AU) .............................. PR 5574
Jun. 8, 2001 (AU) .............................. PR 5575

(51) Int. Cl.[7] .......................... F16L 55/18; E21D 11/00
(52) U.S. Cl. ............................... 405/184.2; 405/184.1; 405/150.1
(58) Field of Search ................... 405/184.2, 184.1, 405/184, 150.1; 138/97, 98

(56) References Cited

U.S. PATENT DOCUMENTS 3,565,170 A * 2/1971 Urbanosky ................ 166/212
4,819,721 A * 4/1989 Long, Jr. .................... 166/55
4,950,356 A * 8/1990 Grace ........................ 156/259
4,995,929 A * 2/1991 Menzel ...................... 156/187
RE34,610 E * 5/1994 Miller et al. ............... 137/597
5,727,904 A * 3/1998 Boyer ........................ 405/156
5,778,936 A   7/1998 McAlpine

FOREIGN PATENT DOCUMENTS

WO    WO 00/17564    3/2002

OTHER PUBLICATIONS

Derwent Abstract Accession No. 2000–312121/27, JP 2000–094517 A (Sekisui Chem Ind Co Ltd) Apr. 4, 2000 Abstract and Figure.

* cited by examiner

Primary Examiner—Heather Shackelford
Assistant Examiner—L. Saldano
(74) Attorney, Agent, or Firm—Klauber & Jackson

(57) ABSTRACT

An hydraulic control arrangement (66) in association with a pipe relining machine Includes fluid pressure supply and return lines (32, 33), a motor controller (80) to control a motor (67) and a radial position controller. The radial position controller supplies fluid under pressure to a radial positioning arrangement (46) to set diameter of a relined pipe. The radial position controller has a first normally closed valve (83) supplying fluid under pressure to the radial positioning arrangement (46) and a second normally open valve (84) allowing fluid to be withdrawn from the radial positioning arrangement (46). The arrangement (66) allows the pipe relining machine to be withdrawn in the event of a failure.

9 Claims, 7 Drawing Sheets

HYDRAULIC CONTROL ARRANGEMENT FOR A PIPE RELINING MACHINE

FIELD OF INVENTION

This invention relates to a system for the relining of pipes particularly underground pipes and particularly to arrangements by which a pipe relining machine operating underground can be operated and controlled from above ground.

BACKGROUND OF THE INVENTION

In pipe relining processes a continuous strip of plastic material is laid in spiral fashion in the inside of a pipe and joined along longitudinal edges to provide a new surface for fluids such a sewage or water to flow through. Operation of a pipe relining device used in the pipe is necessarily from a remote location and it is the object of this invention to provide a system for hydraulic control of such as pipe relining device from a remote location and to provide a fail safe operation system.

When operating a pipe relining device it is necessary to have a power supply and control arrangement to correctly operate and control the relining device. It is also often necessary to get the control and operation unit to difficult places on a site and it is a further object of this invention to provide an arrangement by which such objects can be achieved.

BRIEF DESCRIPTION OF THE INVENTION

In one form therefore although this may not necessarily be the only or broadest form the invention is said to reside in an hydraulic control arrangement for a pipe relining machine, the hydraulic control arrangement including a fluid pressure supply line and a fluid return line to a fluid storage tank, a motor controller to control a motor supplied by the fluid pressure supply line, and a radial position controller, the radial position controller supplying fluid under pressure to a radial positioning arrangement to set diameter of a relined pipe, the radial position controller having a first normally closed valve supplying fluid under pressure to the radial positioning arrangement and a second normally open valve allowing fluid to be withdrawn from the radial positioning arrangement.

Preferably the fluid withdrawn from the radial positioning arrangement is drained to a drain tank.

The pipe relining machine according to one constructional embodiment and in which the hydraulic control circuit of the present invention may be used may have a fixed portion and a rotating portion. Within the fixed portion there may be electrical and hydraulic fluid connections which are supplied from the remote control position from above ground or outside the pipe. A rotary union may then be used to transfer hydraulic fluid and electric control and feedback signals to and from the various operating components within the rotating portion. Within the rotating portion there may be an electrical solenoid controlled hydraulic fluid control block which is remotely controllable from above ground or outside the pipe.

It may be noted that the radial positioning arrangement may be normally operated at a pressure that is lower than the pressure in the fluid pressure supply line and the fluid return line and hence it is not possible to drain the fluid from the radial positioning arrangement back to the storage tank. The drain tank which is preferably within the rotating portion is used for this purpose.

If hydraulic pressure is lost to the relining device or electrical control power is lost then there is a danger that the relining device could be jammed in the pipe and an excavation may be necessary to remove it. Hence a fail safe system is provided according to the invention. The fail safe device is provided by the second normally open valve allowing fluid to be withdrawn from the radial positioning arrangement. If electrical power is lost then the second normally open valve will open allowing hydraulic fluid to drain to the drain tank thereby allowing the radial positioning device to relax its pressure against the previous turn of the pipe or the wall of the pipe to allow the relining device to be withdrawn. Similarly if hydraulic pressure is lost, perhaps by a ruptured hydraulic line or the like then electrical power to the second normally open valve can be removed allowing fluid to be withdrawn from the radial positioning arrangement so that the relining device can be withdrawn.

The radial positioning arrangement may have spring return of its hydraulic actuators to assist with draining of fluid from the actuators in the event of a failure or when it is necessary to remove the relining device.

There may be a pressure transducer associated with the radial positioning arrangement to observe the fluid pressure within the radial positioning arrangement and to allow remote manual or automatic control of the radial positioning arrangement.

In constant size operation when the radial positioning arrangement is held at a constant pressure, this pressure determines how hard out against the host pipe the new pipe being formed will be. The pressure is kept at a sufficiently high value to force the liner or pipe being formed out hard against the host or original pipe so that a maximum diameter pipe is formed. The pressure should not be so high as to cause the pipe relining device to stall. Typically in a segmented sewer pipe or a PVC pipe each segment will have a slightly varying size due to manufacturing tolerances, damage to the pipe or build up of solid material on the inside of the pipe. The pressure transducer allows the operator or automatic control system to maintain the pressure at a constant level when these changes in diameter are encountered. If the pressure is reduced to below a nominal level, caused by friction of the seals for instance, the radial positioning arrangement and hence the rollers forming the relined pipe will retract under the action of the spring and the diameter of the pipe being formed will reduce. If this happens too fast the plastic strip cannot reduce its size quick enough and the strip being laid does not engage with the previous strip. At an intermediate setting an operator or automatic controller can bleed hydraulic fluid from the radial positioning arrangement using the second normally open valve at such a rate that the diameter of the pipe being formed is reduced while still ensuring that the strip being laid engages with the previous strip. This allows the wound pipe size to reduce in diameter at a controlled rate whilst the turns still remain locked to the previous turn.

Further hydraulic control may be provided within the hydraulic control circuit of the present invention for a lateral marking tool to mark branch pipes when relining a pipe and an auxiliary hydraulic supply may be provided to operate devices such as strip cutters or lateral branch opening tools.

In an alternative form the invention may be said to reside in a pipe relining machine including an hydraulic control circuit, the relining machine having a non-rotating portion, a rotary union and a rotating portion, the non-rotating portion having an electrical and hydraulic connections which are supplied from a remote control position from above ground or outside the pipe, the rotary union being to transfer hydraulic fluid and electric control and feedback signals to and from various operating components within the rotating portion from the non-rotating portion, the rotating portion having electrical solenoid controlled hydraulic control block which is remotely controllable from above ground or outside the pipe, the hydraulic control circuit including a fluid pressure supply line and a fluid return line to a fluid storage tank, a motor controller to control a motor supplied by the fluid pressure supply line, and a radial position controllers the radial position controller supplying fluid under pressure to a radial positioning arrangement to set the diameter of the relined pipe, the radial position controller having a first normally closed valve supplying fluid under pressure to the radial positioning arrangement and a second normally open valve allowing fluid to be withdrawn from the radial positioning arrangement.

Preferably the feedback is by means of observation of the hydraulic pressure of an hydraulic fluid supplying the radial positioning arrangement. The control of the diameter may be manual or automatic.

In an alternative form the invention is said to reside in a remote control circuit for a pipe relining machine, the pipe relining machine including a fluid pressure supply line and a fluid return line to a fluid storage tank, a motor to supply relining strip to the pipe relining machine and a motor controller to control the motor supplied by the fluid pressure supply line and a radial position controller, the radial position controller supplying fluid under pressure to a radial positioning arrangement to set the diameter of the relined pipe, the remote control circuit including means to observe the hydraulic pressure in the radial positioning arrangement enabling the force being applied to a previously laid strip to be observed and controlled whereby the diameter of the relined pipe may be varied or held the same.

The means to observe the hydraulic pressure in the radial positioning arrangement may be a pressure transducer.

Preferably the radial position controller has a first normally dosed valve supplying fluid under pressure to the radial positioning arrangement and a second normally open valve allowing fluid to be withdrawn from the radial positioning arrangement, the fluid withdrawn from the radial positioning arrangement being drained to a drain tank. By this means if power to the pipe relining machine is lost the second normally open valve will open thus allowing fluid to be withdrawn from the radial positioning arrangement so that the diameter is reduced and hence relining device can be withdrawn.

In a further form the invention is said to reside in a self propelled power and control unit for a remote operation device, the unit having a motor, drive means for the unit driven by the motor, a power generation arrangement driven by the motor, a cable drum to hold a power supply and control cable, the cable drum adapted to be driven by the motor to unwind and wind the cable and a control arrangement on the unit whereby an operator can observe and control the operation of the remote operation device.

It will be seen that by this form of the invention the power supply and control unit is self propelled by its motor so that it can be driven by an operator to a work site and it has on it the necessary power supply and control functions to enable the remote operation device such as a pipe relining device to be operated.

The power generation arrangement may be electrical power, hydraulic power or both electric and hydraulic. The necessary tanks for hydraulic power supply and oil intercoolers and the like may be provided on the power supply and control unit.

The drive means may be by use of direct drive from the motor or by hydraulic drive or electric drive and may include wheels or tracks and may be operated on the skid steer system. The drive means may be adapted to be reduced in width so that the power supply and control unit can be driven into or through tight situations or to be widened to give better stability during use.

The cable drum may be driven electrically or hydraulically and may include a clutch arrangement to provide a constant tension on the power supply and control cable to wind the cable as the remote operation device is moved. There may be provided slip rings associated with the cable drum for transfer of the necessary hydraulic power and control cables from the unit to the cable.

As discussed above in one form of the invention the remote operation device may be a pipe relining device. The remote operation device may also be other devices associated with pipe relining. These may include video inspection devices which can be driven by power supplied from the power and control unit and carry a video camera which can be viewed by the control arrangement. Alternatively it may be a cleaner unit, lateral cutter or other device. The various items may be connected to the power supply and control cable as required.

The self propelled power and control unit according to this invention may also include a jib crane and winch arrangement which enables a remote operation device to be retrieved and transported as required.

The remote operation device according to this invention may include an operator's seat so that an operator can actually sit on the unit to drive the unit to the necessary work site and from that position observe the various control devices and operate the remote operation devices as required. The control arrangement may include video screens for remote observation of action of the remote operation device as well as control panels and necessary computer systems.

It will be seen generally, therefore, that a self propelled device is provided according to this invention with the necessary arrangements for control and power supply for a remote operation device.

BRIEF DESCRIPTION OF THE DRAWINGS

This then generally describes the invention but to assist with understanding reference will now be made to the accompanying drawings which show a preferred embodiment of the invention.

In the drawings.

DETAIL DESCRIPTION OF PREFERRED EMBODIMENTS

Figure 1:
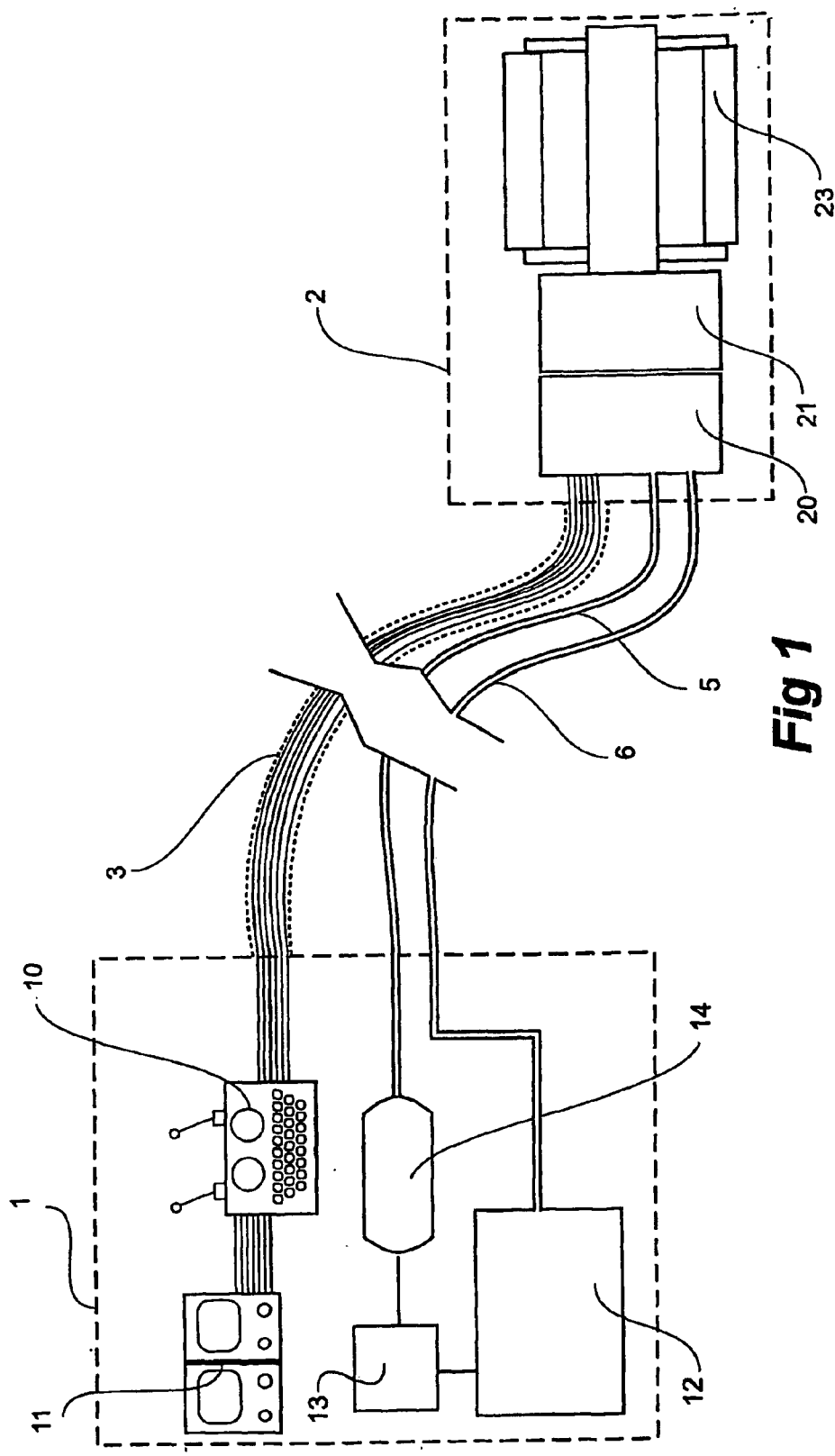
FIG. 1 shows a schematic arrangement of one embodiment of a pipe relining device including an hydraulic control system according to the present invention.

Now looking more closely to the drawings and in particular FIG. 1 it will be seen that the pipe relining arrangement according to the invention has an above ground portion being the portion enclosed within the dotted line 1 and a below ground portion being the portion enclosed within the dotted line 2. Between them are an electrical control signal cable 3 and hydraulic supply 5 and return 6 lines.

Figure 8:
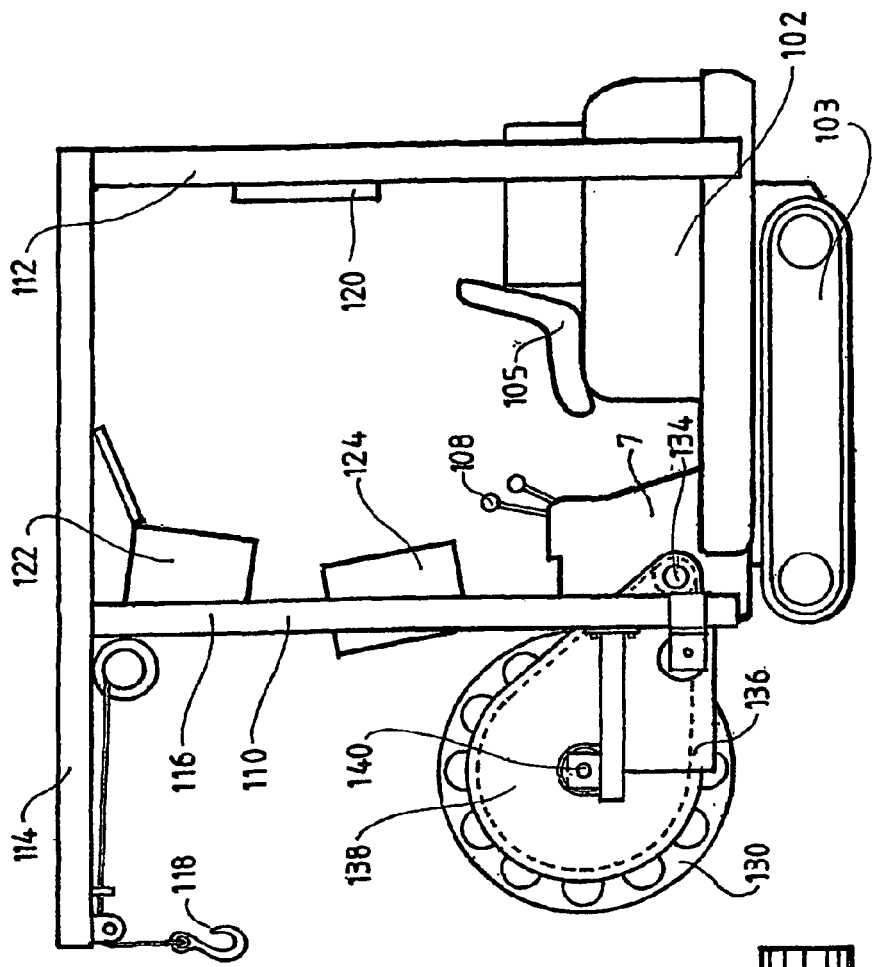
FIG. 8 shows a side view of the unit shown in FIG. 6.

The above ground portion being the portion enclosed within the dotted line 1 will be discussed in detail with respect to FIGS. 6 to 8 but in general includes a control panel 10 and a display 11. Hydraulic fluid reservoir 12 supplies hydraulic pump 13 and pressurised fluid to accumulator 14 for supply along hydraulic supply line 5. Hydraulic return line 6 returns hydraulic fluid to the tank 12.

The below ground portion being the portion enclosed within the dotted line 2 will be generally discussed with reference to FIGS. 2 to 5. In general it includes a fixed portion 20, a rotating portion 21 and a relining strip placement head 23.

Figure 2:
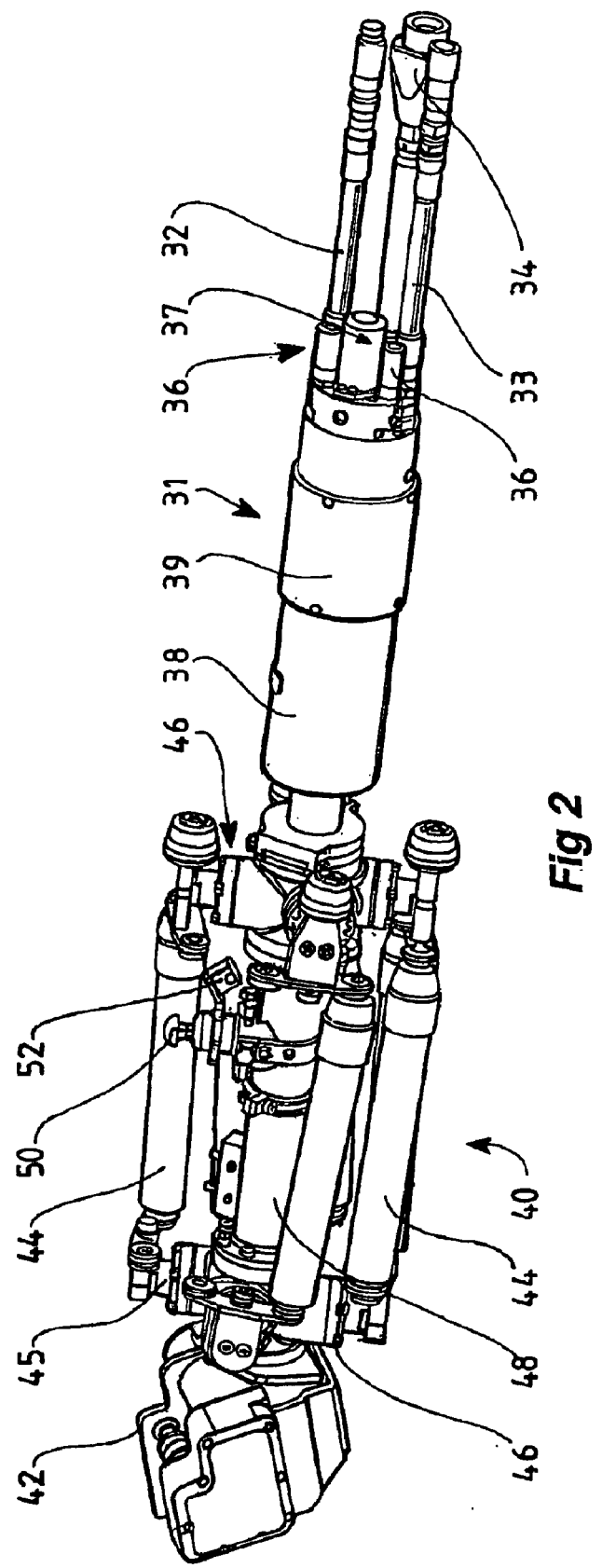
FIG. 2 shows one embodiment of the underground portion of a pipe relining device including an hydraulic control system according to the present invention.

Now looking more closely at FIG. 2 it will be seen that the underground portion of one embodiment of the invention of the pipe relining device includes a forward section generally shown as 31 which has hydraulic fluid inlet 32 and a hydraulic fluid outlet 33. An electrical connection arrangement 34 is also used. The forward portion 31 has forward shining lights 36 and a front or first video camera 37.

In this embodiment of a pipe relining tool the front portion 31 does not rotate while a rotation portion generally shown as 40 rotates as relining occurs and hence a rotary union 39 is provided between the forward section 31 and the rotating portion 40. The rotary union has rotating connections for the hydraulic inlet and outlet lines as will be discussed later as well as rotating electrical connections for electrical devices in the rotating section 40 as required.

The rotating portion 38 of the rotary union 39 houses the hydraulic control circuitry according to the invention.

In the rotating portion 40 a rear drive 42 includes an hydraulic motor to feed relining strip (not shown) to reline the pipe in a system of a type as discussed in PCT Publication WO00/17564

In the process of spiral relining of a pipe from within the relining strip material is forced against a previous spiral of relining strip material and joined to it with a male and female type of connection by means of rollers 44 on support arms 45 supported on a radial positioning arrangement 46 at each end. The radial positioning arrangement 46 provides a radial pressure to ensure the pipe relining is applied firmly against the previous spiral of relining strip of against the wall of the pipe being relined. In this embodiment as particularly shown in FIG. 5 the radial positioning arrangement 46 has four radial arms 45 at each end but more or less could be provided depending upon the space available or the nominal diameter of the pipe being relined. Each arm 45 may have a radially extending hydraulic actuator or there may be a single actuator at each end providing radial pressure by a series of levers of gears. A spring arrangement (not shown) is provided to retract the arms 45.

Figure 5:
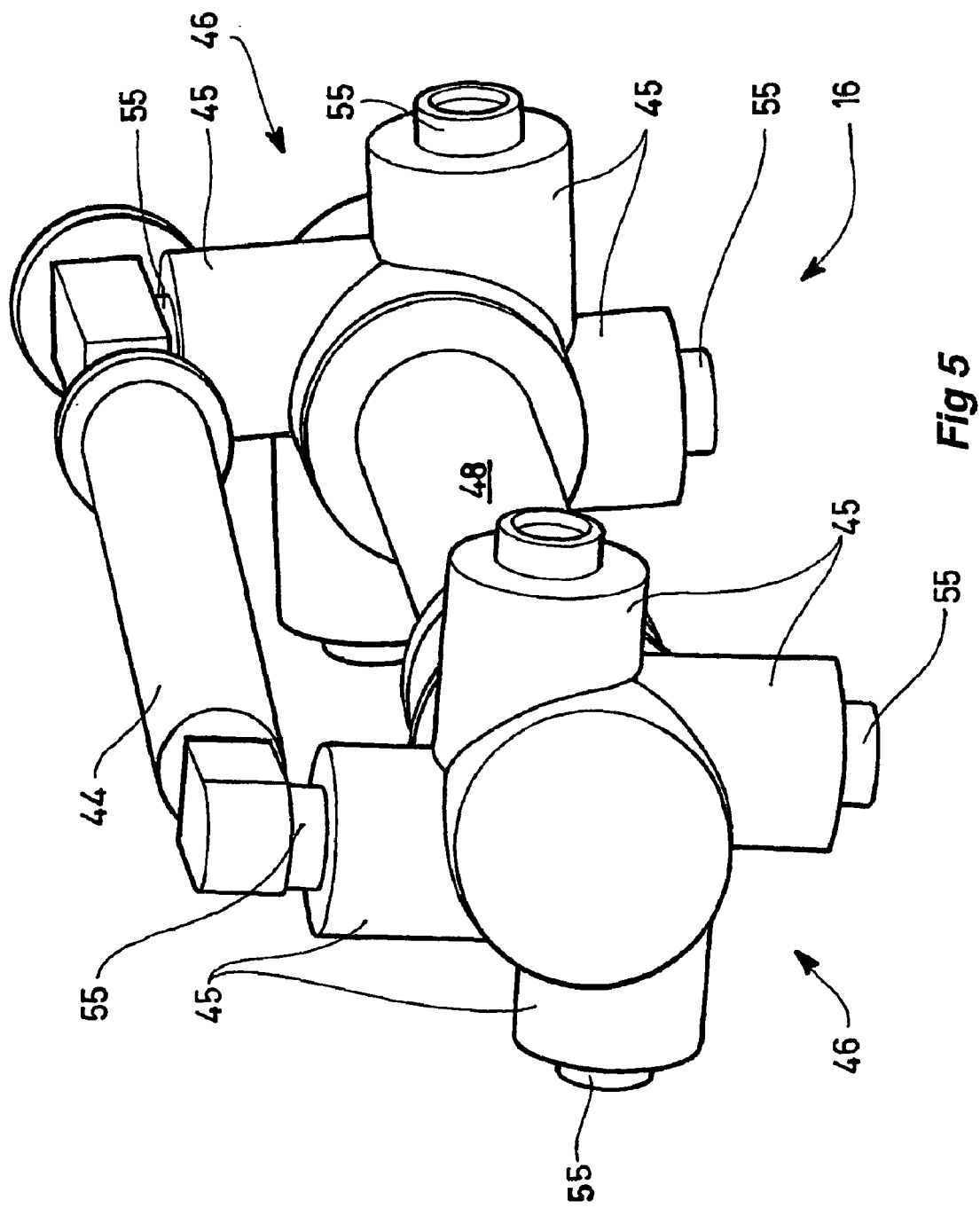
FIG. 5 shows an embodiment of a radial positioning arrangement operated hydraulically according to one embodiment of the invention.

In this illustration shown in FIG. 5 several of the rollers have been omitted so that the region of the rotating device 40 within the rollers can be observed.

Mounted to the central tube 48 of the rotating device is a lateral marking device 50. A second video camera 52 observes the region of a lateral pipe extending from the pipe being relined where the relining material is being applied and after the relining material has been applied the lateral marker 50 can be operated when it is observed to be at the region of the lateral branch pipe to mark the relining material so that subsequently an opening can be cut at that spot.

The radial positioning arrangement 16 as shown in detail in FIG. 5 has the central tube 48 of the rotating portion of the relining device with radial arms 45 extending from each end. In each radial arm is an hydraulic actuator 55 upon the ends of longitudinally adjacent pairs of which are supported the rollers 44 which bear against the walls of the pipe being relined. Springs (not shown) in each arm 45 are adapted to retract the hydraulic actuator 55 in the event of lack of hydraulic power.

Figure 3:
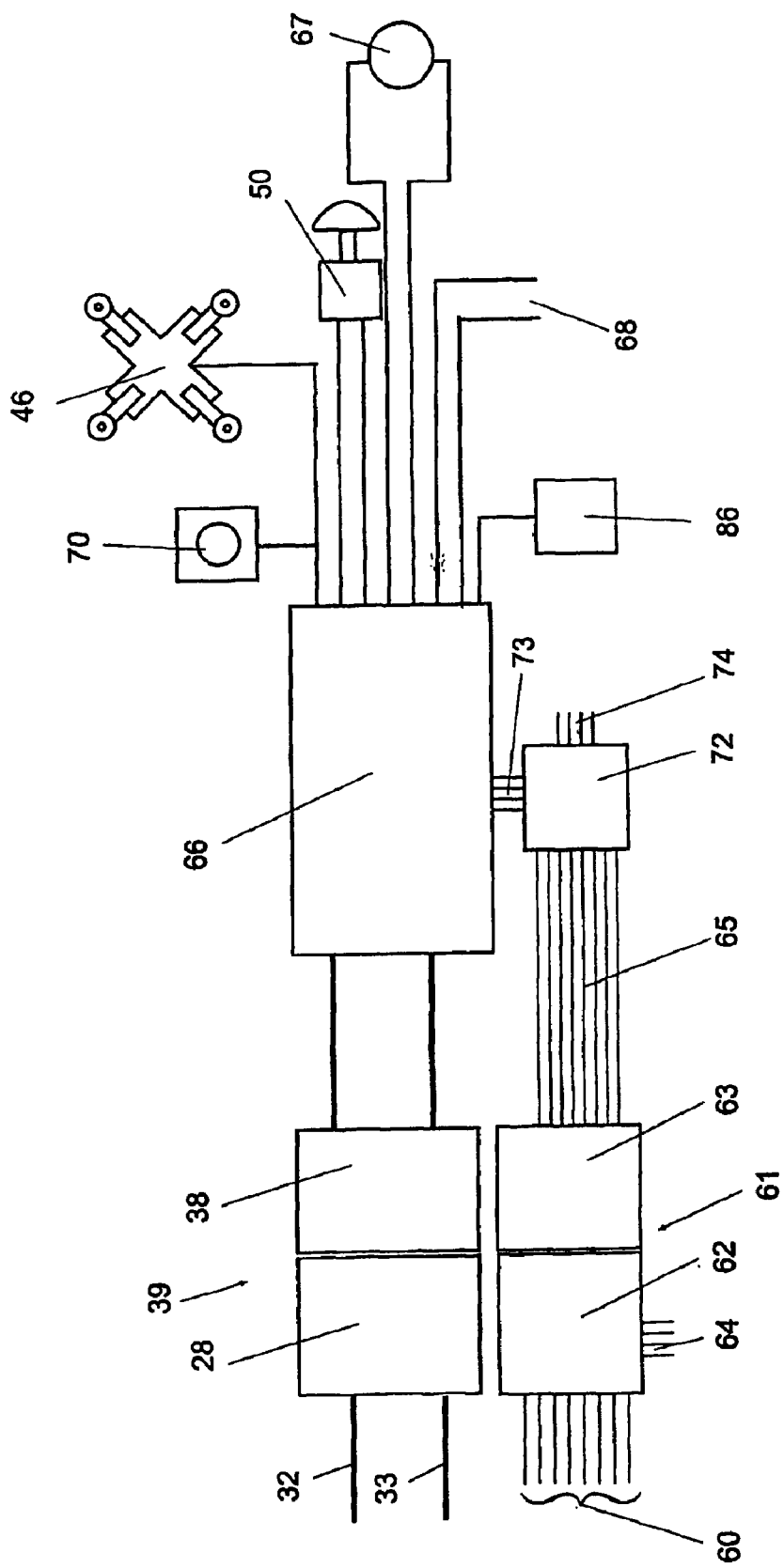
FIG. 3 shows a schematic hydraulic circuit for the embodiment shown in FIG. 2.
Figure 4:
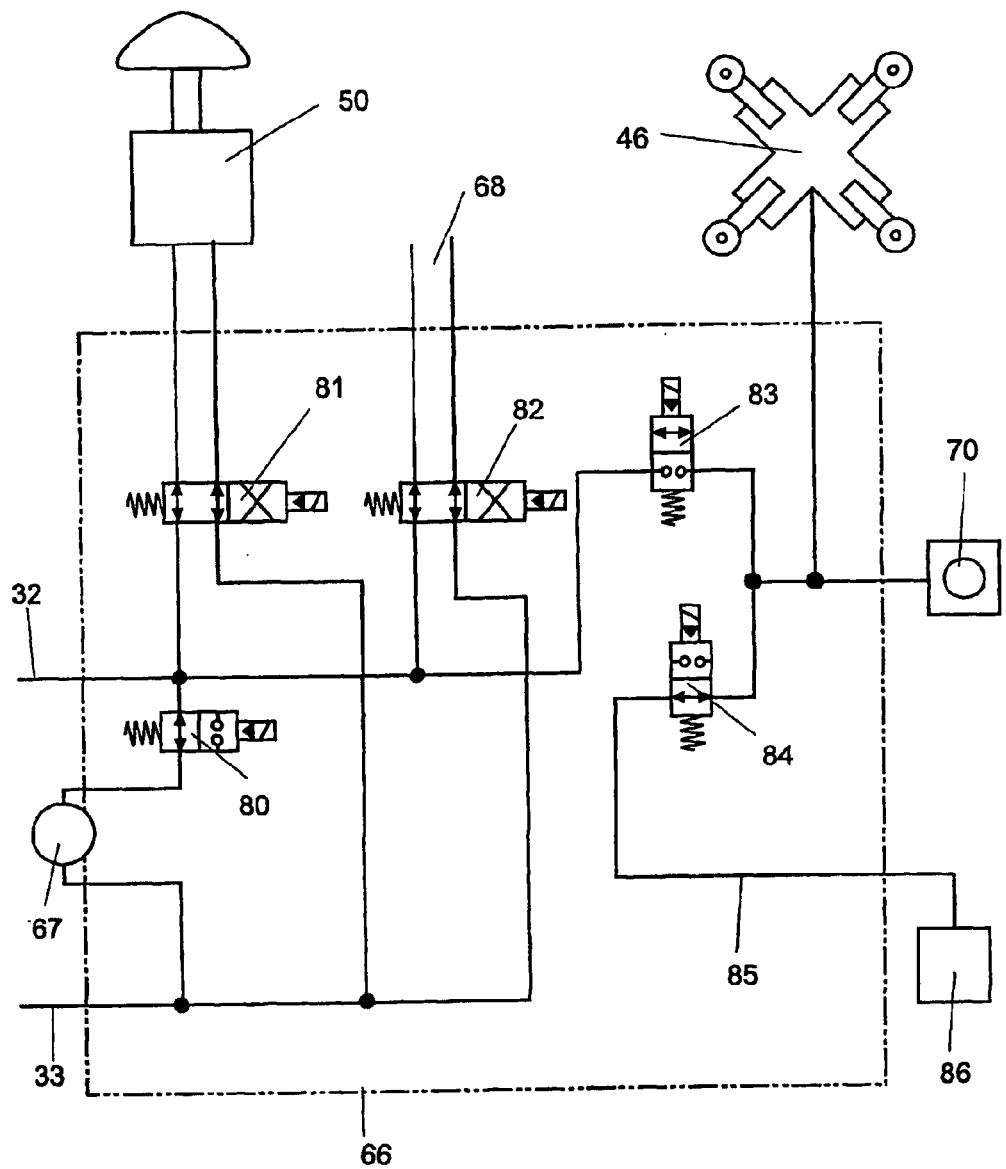
FIG. 4 shows in detail the hydraulic circuit according to one embodiment of FIG. 2.

One embodiment of an hydraulic control circuit according to the present invention is shown in FIGS. 3 and 4.

FIG. 3 shows a schematic electrical and hydraulic circuit according to one embodiment of the invention. In this embodiment pressurised hydraulic fluid supply line 32 and a return line 33 feed into in the non-rotating portion 28 of the rotary union 39 and electrical control and monitoring lines 60 supplied through cable 3 (FIG. 1) feed into the non-rotating portion 62 of the electrical rotary union 61. Some electrical control and monitoring lines 64 remain in the non-rotating portion 62 of the electrical rotary union 61 to go to electrical devices such as the first video camera and associated lights. Other electrical control lines 65 extend from the rotating portion 63 of the electrical rotary union 61.

Hydraulic lines extend from the non-rotating portion 28 of the hydraulic rotary union 39 into the rotating portion 38 of the rotary union and into a control block 66. Within the control block is a series of electrically actuated valves for the various functions of the relining device as will be discussed with reference to FIG. 4. Pressurised fluid is supplied to a motor 67. Hydraulic fluid is also supplied to the radial positioning arrangement 46, to the lateral spotter or marking device 50 as discussed above and to an auxiliary supply 68 for other hydraulically actuated tools and devices as required. Pressure transducer 70 observes the pressure applied to the radial positioning arrangement 46.

Electrical control and monitoring lines 65 extend from the rotating portion 63 of the rotary union 61 to a splitter box 72 from which some electrical lines 73 go to the control block 66 to operate the electrical solenoids and electrical lines 74 go to other electrical devices such as the second video camera 52 and associated lights (FIG. 2) and the pressure transducer 70.

The hydraulic control circuit shown in detail in FIG. 4 has a pressurised hydraulic fluid supply line 32 and a return line 33 feeding into a control block 66. Within the control block 66 is a series of electrically actuated valves for the various functions of the relining device. A motor control valve 80 provides pressurised fluid to the motor 67 when actuated. The valve 80 allows the motor to be driven in either direction so that relining strip material can be laid and unlaid. Hydraulic fluid is also supplied through valve 81 to the lateral spotter or marking device 50 as discussed above and through valve 82 for the auxiliary supply 68 for other hydraulically actuated tools and devices as required.

The hydraulic control circuit also provides pressurised hydraulic fluid to the radial positioning arrangement 46. Valve 83 which is normally closed is actuated to supply hydraulic fluid to the radial positioning arrangement 46 and valve 84, which is normally open when not actuated and closed when actuated, prevents hydraulic fluid draining in line 85 to drain tank 86 during normal operation of the device. A pressure transducer 70 enables the hydraulic fluid pressure supply to the radial positioning arrangement 46 to be monitored remotely and adjusted as required. Automatic monitoring and adjustment may also be used.

As discussed above if hydraulic pressure is lost to the relining device or electrical control power is lost then there is a danger that the relining device could be jammed in the pipe and an excavation may be necessary to remove it and hence a fail safe system is provided according to the invention. The fail safe device is provided by the valve 84 allowing fluid to be withdrawn from the radial positioning arrangement 46. If electrical power is lost then the valve 84 will open allowing hydraulic fluid to drain to the drain tank 86 thereby allowing the radial positioning device 46 to relax its pressure against the wall of the pipe to allow the relining device to be withdrawn. Similarly if hydraulic pressure is lost, perhaps by a ruptured hydraulic line or the like then power to the valve 84 can be deactivated allowing fluid to be withdrawn from the radial positioning arrangement 46 to the tank 86 so that the relining device can be withdrawn.

Now looking more closely at FIGS. 6 to 8 one embodiment of an above ground remote control and power supply arrangement for the pipe relining device will be discussed. This embodiment is a self propelled unit but a static unit such as could be transported on the back of a truck is also within the scope of the invention.

Figure 6:
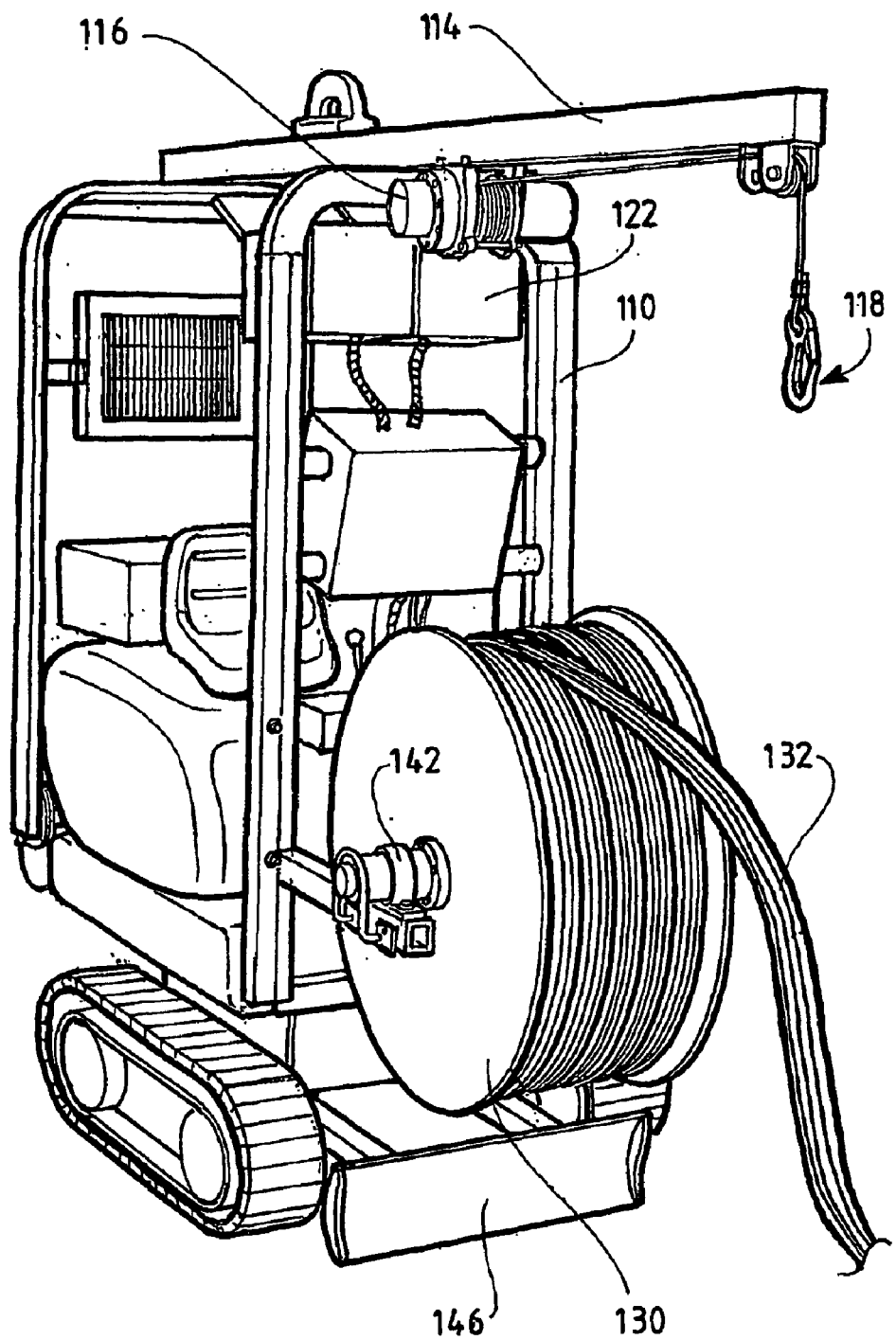
FIG. 6 shows a front prospective view of a self propelled power and control unit being the above ground portion according to the present invention.
Figure 7:
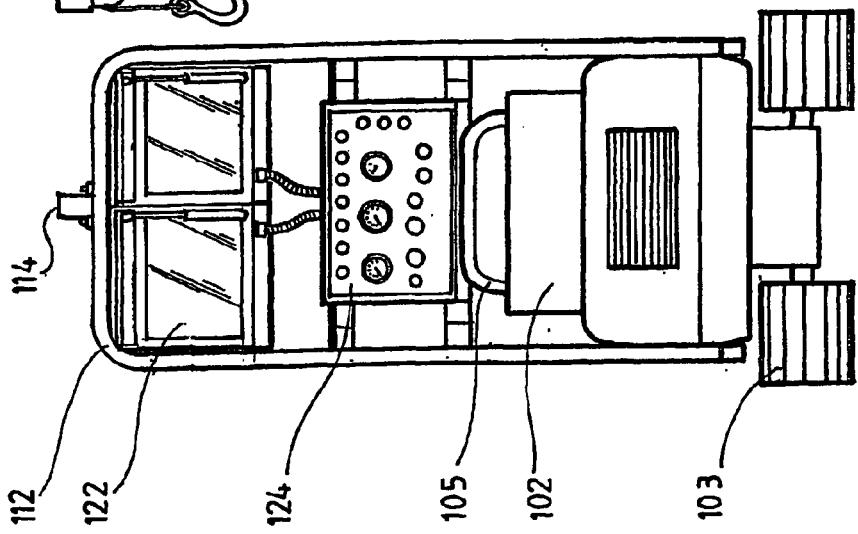
FIG. 7 shows a rear view of the unit shown in FIG. 6.

In FIG. 6 it will be seen that the above ground remote control and power supply arrangement comprises a body 102 which is supported on tracks 103. Within the body and not shown is a motor and power generation system including an hydraulic pump (item 13 in FIG. 1) and electrical generators. The tracks may be driven hydraulically and may include arrangements for moving the tracks wider for better stability. On the body is an operator's seat 105 and a drive panel 107 with the necessary controls 108 for driving the unit.

A forward frame 110 and a rearward frame 112 mounted to the body 102 support a jib crane 114. On the jib crane is a winch 116 which drives a crane cable and hook 118.

Supported on the rear frame 112 is an oil cooler 120 for the hydraulic pump. The oil cooler is omitted in FIG. 7 for clarity.

Supported on the forward frame 110 is a pair of video screens 122. An operator sitting on the seat 105 can observe the video screens 122 to follow what is occurring remotely at the underground portion of the pipe relining device via video cameras 37 and 52 (FIG. 2). A control panel 124 is also supported on the front frame 110 which enables the operator to observe readings from functions of the underground portion of the pipe relining device and to control the underground portion of the pipe relining device accordingly.

Mounted to the front of the self propelled power and control unit is a cable drum 130 upon which is rolled a power supply and control cable 132. The cable drum is driven by a motor 134 through chain 136 within chain housing 138.

On the left hand side of the cable drum are electrical slip ring arrangements 140 by which electrical control for the remote operation device is transferred to the control cable 132 and on the right hand device are hydraulic slip rings 142 by which hydraulic power for the underground portion of the pipe relining device is provided to the cable drum.

Although a combined power and control cable is shown in this embodiment wound onto a single cable drum in an alternative embodiment there may be separate control cables and power supply cables. The power supply cables may be hydraulic power or electrical power cables.

The unit according to this invention may also include a dozer blade 146 which can be used to clear a work area where necessary and when bearing against the ground can provide stability during operation of the crane.

It will be seen that by this arrangement there is provided a self propelled unit which can be driven by an operator to a work site and all of the necessary functions for operation of a remote operation device such as a pipe reliner are provided on the unit.

Throughout this specification various indications have been given as to the scope of the invention but the invention is not limited to any one of these but may reside in two or more of these combined together. The examples are given for illustration only and not for limitation.

What is claimed is:

1. A pipe relining machine including an hydraulic control circuit, the relining machine having a non-rotating portion, a rotary union and a rotating portion, the non-rotating portion having an electrical and hydraulic connections which are supplied from a remote control position from above ground or outside the pipe being relined, the rotary union being to transfer hydraulic fluid and electric control and feedback signals to and from various operating components within the rotating portion from the non-rotating portion, the rotating portion having electrical solenoid controlled hydraulic control block which is remotely controllable from above ground or outside the pipe, the hydraulic control circuit including a fluid pressure supply line and a fluid return line to a fluid storage tank, a motor controller to control a motor supplied by the fluid pressure supply line, and a radial position controller, the radial position controller supplying fluid under pressure to a radial positioning arrangement to set the diameter of the pipe being relined, the radial position controller having a first normally closed valve supplying fluid under pressure to the radial positioning arrangement and a second normally open valve allowing fluid to be withdrawn from the radial positioning arrangement.

2. A pipe relining machine as in claim 1 wherein the fluid withdrawn from the radial positioning arrangement is drained to a drain tank.

3. A pipe relining machine as in claim 1 further including a pressure transducer associated with the radial positioning arrangement to observe the fluid pressure within the radial positioning arrangement and to allow remote manual or automatic control of the radial positioning arrangement.

4. A pipe relining machine as in claim 1 further including a lateral marking tool to mark branch pipes when relining a pipe.

5. A pipe relining machine as in claim 1 wherein the hydraulic control circuit includes a power and control unit for the pipe relining machine, the unit having a motor, drive means for the unit driven by the motor, a power generation arrangement driven by the motor, a cable drum to hold a power supply and control cable, the cable drum adapted to be driven by the motor to unwind and wind the cable and a control arrangement on the unit whereby an operator can observe and control the operation of the pipe relining machine.

6. A pipe relining machine as in claim 1 further including a feedback arrangement enabling the radial position of the radial positioning arrangement to be observed and controlled whereby the diameter of the relined pipe may be varied or held the same.

7. A pipe relining machine as in claim 1 wherein the remote control position comprises a power and control unit for the pipe relining machine, the power and control unit having a motor, drive means for the unit driven by the motor, a power generation arrangement driven by the motor, a cable drum to hold a power supply and control cable, the cable drum adapted to be driven by the motor to unwind and wind the cable and a control arrangement on the unit whereby an operator can observe and control the operation of the pipe relining machine; the power and control unit having a feedback arrangement enabling the radial position of the radial positioning arrangement to be observed and controlled whereby the diameter of the pipe being relined may be varied or held the same.

8. A pipe relining machine as in claim 7 wherein the feedback is by means of observation of the hydraulic pressure of an hydraulic fluid, supplying the radial positioning arrangement.

9. A pipe relining machine arrangement as in claim 7 wherein the power and control unit is a self propelled power an control unit.

* * * * *